3,452,399
INJECTION MOLD CLOSURE DEVICE
Armin Blumer, Glarus, Switzerland, assignor to Maschinenfabrik und Giesserei Netstal AG, Netstal, Switzerland
Filed Aug. 15, 1966, Ser. No. 572,267
Claims priority, application Switzerland, Aug. 19, 1965, 11,840/65
Int. Cl. B29f 1/00
U.S. Cl. 18—30    2 Claims

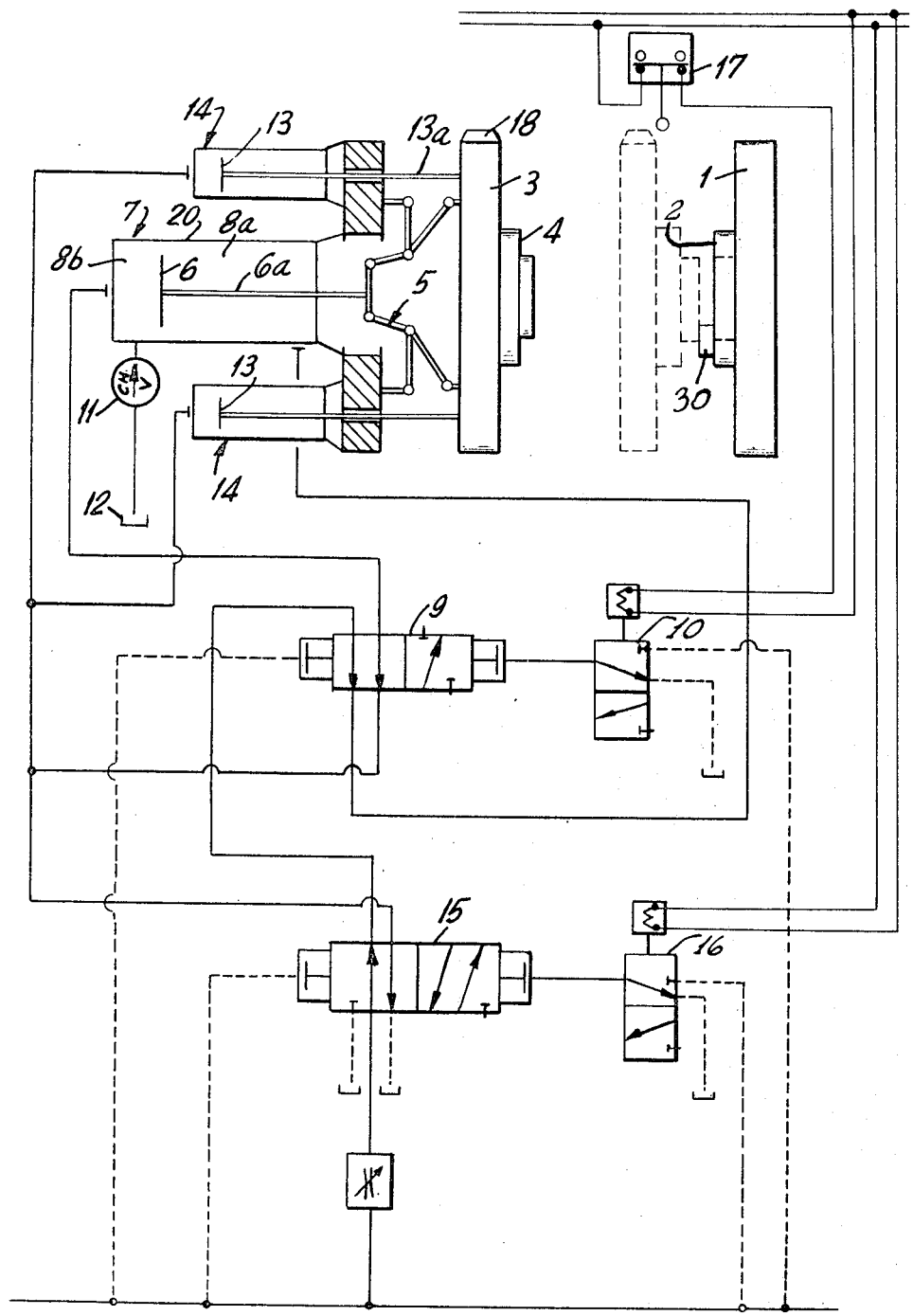

ABSTRACT OF THE DISCLOSURE

A device for controlling the movement of a movable mold member so as to prevent the engagement of the movable mold member with the stationary mold member if there is foreign matter between the mold members.

---

This invention relates in general to the construction of injection molding machines and in particular to a new and useful injection molding machine having means for separately closing the mold with a uniform closing force and for applying a high mold closure force to a separable mold elements only after they have been moved into a correctly oriented closed position.

The present invention deals particularly with the construction of injection or press mold apparatus and provides a protection therefor to prevent damage or destruction of the mold parts in the event that there is any object in the path of the closing mold elements which may interfere with their closing. In the known molding apparatus the mold elements are usually controlled by a single hydraulic piston acting through a mechanism such as a toggle lever arrangement to provide for both the closing and mold holding force during molding operations. The piston is operated to apply a force which constantly increases during the closure due to the constantly changing lever conditions of the toggle mechanism. Even with the smallest driving force of the hydraulic piston several tenths of millimeters prior to the contact of the two mold halves, there are developed very great forces of several tons. Due to such high forces, the molds may be destroyed or at least may be seriously damaged if an object is unintentionally present between the mold halves as they are closing.

A further disadvantage of the known devices is that the response force or molding force of the device is not constant over the entire region or range of the closure movement and thus is dependent on the dimensions of any interfering object which may be present between the mold parts.

In accordance with the present invention there is provided a separate means for causing the closure of the mold elements which advantageously includes at least one closure member and which also includes a main piston for creating the closure force which acts on a toggle lever mechanism which becomes active on the mold parts only after the mold parts have been moved to approximately their closed position.

Accordingly, it is an object of the invention to provide an improved mold closure apparatus which includes a separate piston element for moving a movable mold part toward a stationary mold element and a closure force applying piston acting through a toggle mechanism on the movable mold element to apply a closure force thereto only after the movable mold element has reached approximately a closing position.

A further object of the invention is to provide a safety apparatus for operating injection mold elements which provides for an even closure force on a movable mold element and thereafter an increased high force on the element only after it has been moved into a safe closed position.

A further object of the invention is to provide an injection molding device which is simple in design, rugged in construction and economical to manufacture.

The various features of novelty which characterize the invention are pointed out with particularity in the claims annexed to the forming a part of this specification. For a better understanding of the invention, its operating advantages and specific objects attained by its use, reference should be had to the accompanying drawings and descriptive matter in which there is illustrated and described a preferred embodiment of the invention.

The only figure of the drawings is a schematic partial elevational and partial sectional view of the injection moldings device with the operating controls schematically indicated.

Referring to the drawing in particular, the invention embodied therein comprises a stationary mold mounting member 1 carrying a mold half 2 which is cooperable with a movable closure plate of mold mounting member 3 carrying a mold half 4.

In accordance with the invention the movable mold closure plate 3 is moved toward a closed position by means of pistons 13 which are displaced within respective fluid cylinders 14 simultaneously and with equal force to cause the movable carrier plate 3 to move to a position at which the mold 4 closes with the mold 2. The pistons 13 carry piston rods 13a which are connected as indicated to each end of the closure plate 3. In addition to the means for moving the closure plate 3 with uniform closure force to the point at which the mold 4 substantially engages or actually engages the mold 2, there is provided a fluid piston mechanism generally designated 7 for applying a large closure force to the closure plate. The mechanism 7 includes a fluid cylinder 20 in which is reciprocable a piston 6 which is connected through a piston rod 6a to a toggle mechanism which is generally designated 5. The piston 6 is displaced during the closure movement of the pistons 13 but does not apply an active closure force to the toggle mechanism until the mold 4 is in engagement with the mold 2 which will take place only if there is no object which may interfere with the engagement located between these mold parts.

In order to provide for the automatic operation of the pressure cylinders 14 and also the pressure mechanism 7, there are provided separate control valves 9 and 15 which are operated by magnetic valves 10 and 16, respectively. The control valves 9 and 15 are connected to the respective cylinders 14 and 20 as indicated. As can be seen from the drawings, the spaces 8b and 8a on respective opposite sides of the piston 6 are separately connected through the lines shown to the control valve 9 and the control valve 15. The space 8b is also connected with an equalization reservoir 12 through a suction valve 11.

The control of the pressure cylinders 14 is also accomplished through the control valves 9 and 15 which are actuated by the magnetic valves 10 and 16, respectively. In addition the magnetic valves 10 and 16 are made operative only when a contact member 17 is actuated upon the closure of the carrier plate 3 to a position at which operation of the high pressure closure force through the mechanism 7 is possible. The switch 17 is actuated by contact with the camming surface 18 defined on the closure plate 3 when the latter is moved to a closed position.

During operation of the device the two magnetic valves 10 and 16 are put under tension through an electrical push button control (not shown). The valves 9 and 15 are thus reversed so that the pressure liquid can act from the hydraulic system only on the pistons 13. In this manner the closure movement of the closure plate 3 takes place. The liquid which is freed or released from the storage space 8a of the mechanism 7 during movement of the pistons 13, 13 is pressed through the valve 9 into the pressure space 8b of the device 7. Since the filling volume of the pressure space 8b is larger than the liquid volume which is released from the storing space 8a, the remainder of the liquid which will still be required to is fed to the suction valve 11 from the reservoir 12 by atmospheric pressure.

When the two mold halves 2 and 4 have come into contact with each other, provided there is no object in the way which would interfere with such contact the contact element 17 will be closed by the cam 18. The contact causes the magnetic valve 10 to be disconnected from the electrical current circuit and therefore the control valve is moved into an original or starting position where liquid can pass through the control valve 9 to the piston 6 in the cylinder 20 and cause the toggle lever system 5 to apply complete closure pressure.

However, if an extraneous object is situated between the separating planes of the mold, then the contact 17 will not be closed and no pressure build-up in the pressure space 8b of the device will take place. By means of a delay relay (not shown) which is actuated during the closure movement, an optical or acoustical alarm device may be caused to be actuated if, after a predetermined set delay time, the pressure build-up in the device 7 has not taken place. With the same device the mold can, however, be opened again.

The closure movement is thus caused by the hydraulic piston 13 which acts directly on the movable closure plate 3 and through corresponding hydraulic and electrical control elements 9, 10; 15 and 16. The closure force generation is accomplished by contrast through the working piston 6 which becomes effective only if the molds or parts are properly closed. The electro-hydraulic control functions in a manner such that when an extraneous object, for example a tenth of a millimeter in dimension, should be present between the two mold halves, no hydraulic pressure liquid can act on the cross section of the piston 6. The force which in this case acts on the form half of the extraneous object corresponds in each point to the feed stroke of the relatively small force of the piston 13. Only the electrical contact 17 which is adjusted to the mold height gives the signal for the pressure generation by means of the working piston 6. However, if an extraneous object 30 is present between the mold separating surfaces, then no contact takes place between the cam 18 and the switch 17 when the movable mold 3 is in the position shown in dotted outline and consequently no pressure force is exerted with the piston 6.

While a specific embodiment of the invention has been shown and described in detail to illustrate the application of the inventive principles, it will be understood that the invention may be embodied otherwise without departing from such principles.

What is claimed is:

1. An injection mold closing device comprising a fixed mold member, a movable mold member, mold closing means to move said movable mold member into and out of engagement with said fixed mold member, control means to actuate said mold closing means and actuating safety means selectively operating said control means causing said movable mold member to engage said fixed mold member only when there is no foreign object between said members to interfere with the engagement, said mold closing means including first position closing means to move said movable mold member to a first position short of engagement with said fixed mold member and second position closing means to move said movable mold member from said first position into engagement with said fixed mold member and to apply molding pressure, said first position means including fluid operated pistons connected to each end of said movable mold member and said second position means including a fluid operated piston located centrally of said movable mold member, said control means including a unitary fluid control system for effecting displacement of the pistons of both said first and second position means, the fluid force being applied to said second position means only upon operation of said actuating safety means.

2. An injection mold closing device as set forth in claim 1, wherein said actuating means includes a switch mounted adjacent said stationary mold member at a location to engage said movable mold member when it moves to said first position, a cam integral said movable mold member to actuate said switch and connecting means joining said switch to said fluid control system causing said fluid control system to apply fluid pressure through said second positioning means to place the movable mold member into engagement with said fixed member.

References Cited

UNITED STATES PATENTS

| 2,371,547 | 3/1945 | Rosenlund et al. |
| 2,498,264 | 2/1950 | Goldhard. |
| 3,120,039 | 2/1964 | Stubbe et al. |

FOREIGN PATENTS

| 1,084,197 | 7/1954 | France. |
| 1,335,485 | 7/1963 | France. |

DORSEY NEWTON, *Primary Examiner.*

U.S. Cl. X.R.

18—16; 100—53, 272; 164—341